United States Patent [19]
Funahashi et al.

[11] Patent Number: 5,769,749
[45] Date of Patent: Jun. 23, 1998

[54] AUTOMATIC TRANSMISSION

[75] Inventors: Makoto Funahashi; Hiroshi Ito; Teruhumi Miyazaki; Seitoku Kubo, all of Toyota, Japan

[73] Assignee: Toyota Jidosha Kabushiki Kaisha, Toyota, Japan

[21] Appl. No.: 684,982

[22] Filed: Aug. 22, 1996

[30]   Foreign Application Priority Data

Sep. 7, 1995   [JP]   Japan ..................................... 7-255681

[51] Int. Cl.$^6$ ...................................................... F16H 3/44
[52] U.S. Cl. ................................................ 475/276; 475/281
[58] Field of Search ................................... 475/204, 205, 475/206, 275, 276, 281, 285, 280

[56]   References Cited

U.S. PATENT DOCUMENTS

| 4,914,978 | 4/1990 | Moroto et al. ....................... 475/281 X |
| 4,938,096 | 7/1990 | Takahashi et al. .................. 475/206 X |
| 5,213,552 | 5/1993 | Ito .......................................... 475/276 |
| 5,224,908 | 7/1993 | Nishida et al. ........................ 475/283 |
| 5,354,244 | 10/1994 | Shirataki ................................ 475/205 |
| 5,370,589 | 12/1994 | Lepelletier . | |
| 5,470,284 | 11/1995 | Taniguchi et al. .................. 475/206 X |
| 5,584,775 | 12/1996 | Miura et al. ......................... 475/284 X |

FOREIGN PATENT DOCUMENTS

| 0 302 723 | 2/1989 | European Pat. Off. . |
| 37 41 746 | 6/1988 | Germany . |
| 42 01 653 | 7/1992 | Germany . |

Primary Examiner—Khoi Q. Ta
Assistant Examiner—Peter T. Kwon
Attorney, Agent, or Firm—Oblon, Spivak, McClelland, Maier & Neustadt, P.C.

[57]   ABSTRACT

An automatic transmission having a construction in which a third planetary gear mechanism is arranged in parallel with CR—CR coupled first and second planetary gear mechanisms so that the drive force is transmitted from the carrier of the first planetary gear mechanism to the ring gear of the third planetary gear mechanism. The input is transmitted to a first sun gear through a first clutch and to a second sun gear through a second clutch. The construction further includes a one-way clutch for fixing the sun gear of the third planetary gear mechanism.

13 Claims, 5 Drawing Sheets

| POSITION | | CLUTCH & BRAKE | | | | | | O.W.C. | |
|---|---|---|---|---|---|---|---|---|---|
| | | C1 | C3 | B1 | B2 | Co | Bo | F1 | Fo |
| N.P | | × | × | × | × | × | ○ | × | × |
| R | | × | ○ | × | ○ | × | ○ | × | × |
| D 2.L | 1st | ○ | × | × | × | × | ○ | ○ | △ |
| | 2nd | ○ | × | ○ | × | × | ○ | × | △ |
| | 3rd | ○ | ○ | × | × | × | ○ | × | △ |
| | 4th | ○ | ○ | × | × | ○ | × | × | × |
| 1st ENGINE BRAKE | | ○ | × | × | ○ | × | ○ | △ | △ |

| POSITION | CLUTCH & BRAKE | | | | | | | O.W.C. | |
|---|---|---|---|---|---|---|---|---|---|
| | C1 | C2 | C3 | B1 | B2 | Co | Bo | F1 | Fo |
| N.P | × | × | × | × | × | × | ○ | × | × |
| R | × | × | ○ | × | ○ | × | ○ | × | × |
| 1st | ○ | × | × | × | × | × | ○ | ○ | △ |
| 2nd | ○ | × | × | ○ | × | × | ○ | × | △ |
| 3rd | ○ | ○ | × | × | × | × | ○ | × | △ |
| 4th | × | ○ | × | ○ | × | × | ○ | × | △ |
| 5th | × | ○ | × | ○ | × | ○ | × | × | × |
| 1st ENGINE BRAKE | ○ | × | × | × | ○ | × | ○ | △ | △ |

AUTOMATIC TRANSMISSION

BACKGROUND OF THE INVENTION

1. Field of the Invention

The present invention relates to an automatic transmission for a vehicle and, more particularly, to a gear type speed change mechanism constructed mainly of a plurality of planetary gear mechanisms.

2. Related Art

A speed change unit using a plurality of planetary gear mechanisms is advantageous in that it can execute speed changes without any change in the meshing engagement of gears and in that an input shaft and an output shaft can be arrayed on a common axis. For these advantages, the speed change unit of this kind is adopted in many automatic transmissions for vehicles.

As the engine mounting type, on the other hand, there is known a transverse type vehicle, on which the automatic transmission is also transversely mounted. In other words, the automatic transmission is mounted to have its center axis directed transversely of the vehicle. As a result, the transverse type automatic transmission has its axial length extremely restricted because of the small width of the vehicle.

In the prior art, therefore, the transverse type automatic transmission having a large number of gear stages to be set is equipped with a planetary gear mechanism on the same axis as that of the input shaft and another planetary gear mechanism on a counter shaft parallel to the former, as exemplified in Japanese Patent Laid-Open No. 302748/1992.

This automatic transmission is constructed to include: two sets of single pinion type planetary gear mechanisms arranged on the same axis as that of an input shaft and having their individual carriers and ring gears connected to each other; a first clutch for transmitting the input to the sun gear of the first planetary gear mechanism having a carrier as an output element; a second clutch for transmitting the input to the carrier of the second planetary gear mechanism; and a third clutch for transmitting the input to the sun gear of the second planetary gear mechanism. The automatic transmission further includes, as its brake means: a first brake for fixing the sun gear of the second planetary gear mechanism; and a second brake for fixing the carrier of the second planetary gear mechanism and the ring gear, as connected to the former, of the first planetary gear mechanism.

On the counter shaft parallel to the input shaft, moreover, there is provided one set of single-pinion type third planetary gear mechanism which has a ring gear connected to the carrier of the first planetary gear mechanism through a counter gear pair. The carrier of the third planetary gear mechanism is connected to the counter shaft. Further provided are a fourth clutch for connecting and uniting that carrier and the sun gear, and a one-way clutch and a third brake for fixing the sun gear.

In the automatic transmission as disclosed in the above-specified Laid-Open, therefore, 1st and 2nd speeds in the underdrive state and a 3rd speed in the direct-coupled state are established by the first and second planetary gear mechanisms which are arranged on the same axis as that of the input shaft. At these 1st to 3rd speeds, the third planetary gear mechanism is set in the underdrive state. Moreover, a 4th speed in the direct-coupled stage is established by bringing the first and second planetary gear mechanisms into the direct-coupled state and the third planetary gear mechanism into the direct-coupled state, and a 5th speed in the overdrive stage is established by bringing the first and second planetary gear mechanisms into the overdrive state and the third planetary gear mechanism into the direct-coupled state.

In the aforementioned transverse type automatic transmission, the third planetary gear mechanism is brought at the 1st to 3rd speeds into the underdrive state and at the 4th and 5th speeds into the direct-coupled state, so that a speed change is caused in the third planetary gear mechanism at the shifting time between the 3rd and 4th speeds. Since the sun gear of the third planetary gear mechanism is made to receive a reaction torque through the one-way clutch, this one-way clutch is applied at the shifting between the 3rd and 4th speeds. However, the gear stage to be set at an ordinary cruising time is the highest one so that a downshift from or an upshift to the highest gear stage is caused by a temporary change in the vehicle speed or the throttle opening during the travel.

In the automatic transmission thus far described, therefore, the most frequent speed change occurs between the 4th and 5th speeds. This speed change is caused in the so-called "clutch-to-clutch manner" by releasing the first clutch and applying the second brake, as provided in association with the first and second planetary gear mechanisms. This clutch-to-clutch speed change is required to control the oil pressure of one frictional engagement unit delicately in connection with that of the other frictional engagement unit. The aforementioned automatic transmission is disadvantageous in that it has to effect that delicate clutch-to-clutch shift control frequently.

In the prior art, on the other hand, the number of gear stags to be set is changed without any change in the fundamental construction of the automatic transmission. This is invited from the request for the reduction of cost by sharing the parts. In the prior art, the number of gear stages to be set is ordinarily changed by adding or removing the overdrive unit. If the aforementioned automatic transmission of the prior art is to be changed according to that method into a four forward speed automatic transmission, the aforementioned third planetary gear mechanism is eliminated, and the output element or carrier of the first planetary gear mechanism is connected to the counter shaft through the counter gear pair. Thus, many parts including the transmission case can be shared between the five-speed automatic transmission and the four-speed automatic transmission. In addition, the highest gear stage of the four-speed automatic transmission can be set to the overdrive stage at which the gear ratio is less than "1".

Despite of this fact, however, the four-speed automatic transmission having the two, i.e., first and second planetary gear mechanisms invites a disadvantage that it is axially elongated for the four-speed automatic transmission, because all of the two planetary gear mechanisms and the frictional engagement units are arranged on the axis common to the input shaft.

SUMMARY OF THE INVENTION

It is, therefore, a major object of the present invention to provide an automatic transmission which can change the speed change control and the number of gear stages easily and can reduce the axial length.

Another object of the present invention is to share the parts among automatic transmissions having different numbers of gear stages to be set.

Still another object of the present invention is to provide an automatic transmission which can control the speed change easily in the ordinary cruising range.

The automatic transmission to be premised by the present invention comprises: first and second planetary gear mechanisms arrayed on a common axis and each including three components of a sun gear, a ring gear and a carrier such that any two of the components of the first planetary gear mechanism are connected one-by-one to any two of the components of the second planetary gear mechanism to construct four rotary elements; and a third planetary gear mechanism arranged on an axis parallel to the common axis of the first and second planetary gear mechanisms and including three components of a sun gear, a ring gear and a carrier such that the first ones of the four rotary elements and any of the three components of the third planetary gear mechanism are connected to transmit a power. The automatic transmission of the present invention comprises: an input member for inputting a drive power; first clutch means for connecting the second one of the four rotary elements and the input member selectively; second clutch means for connecting the input member and the third one of the four rotary elements selectively; an output member connected to one other than such one of the three components of the third planetary gear mechanism as is connected to the first rotary elements; and a one-way clutch arranged between any of the three components of the third planetary gear mechanism and a stationary member and adapted to be switched in its applied state when the third planetary gear mechanism is to be switched between a high-speed drive state, at which the output member rotates at a high speed, and a low-speed drive state at which the same rotates at a low speed.

In the automatic transmission of the present invention, therefore, the speed change between the highest gear stage or 4th speed and the next lower gear stage is executed by the third planetary gear mechanism, and the plurality of planetary gear mechanisms for establishing the four forward speeds are separately arranged on the two axes so that the automatic transmission can be axially shortened in its entirety.

The automatic transmission of the present invention can further comprise third clutch means for connecting the input member and the fourth ones of the four rotary elements selectively.

The automatic transmission thus constructed can establish five forward gear stages and can be axially shortened in its entirety.

In the present invention, moreover, the first clutch means and the second clutch means may be arrayed at the two sides across the first planetary gear mechanism and the second planetary gear mechanism and on the same axis as that of the first and second planetary gear mechanisms.

If the third clutch means is comprised, the first clutch means and the third clutch means may be arrayed at the two sides across the first planetary gear mechanism and the second planetary gear mechanism and on the same axis as that of the first and second planetary gear mechanisms.

The automatic transmission thus constructed can be interchanged between those for the four and five forward gear stages in dependence upon whether or not the third clutch means is comprised, so that its parts can be shared to reduce the cost.

The automatic transmission of the present invention can further comprise another one-way clutch connected to any of the four components and adapted to be applied when the gear ratio to be set by the first planetary gear mechanism and the second planetary gear mechanism takes the maximum.

As a result, the speed change of high torque fluctuation and the speed change of high frequency can be executed by the one-way clutch, if comprised, so that the speed change can be easily controlled while preventing the deterioration of the shift shock.

The above and further objects and novel features of the present invention will more fully appear from the following detailed description when the same is read with reference to the accompanying drawings. It is to be expressly understood, however, that the drawings are for purpose of illustration only and are not intended as a definition of t limits of the invention.

Figures 1, 4:
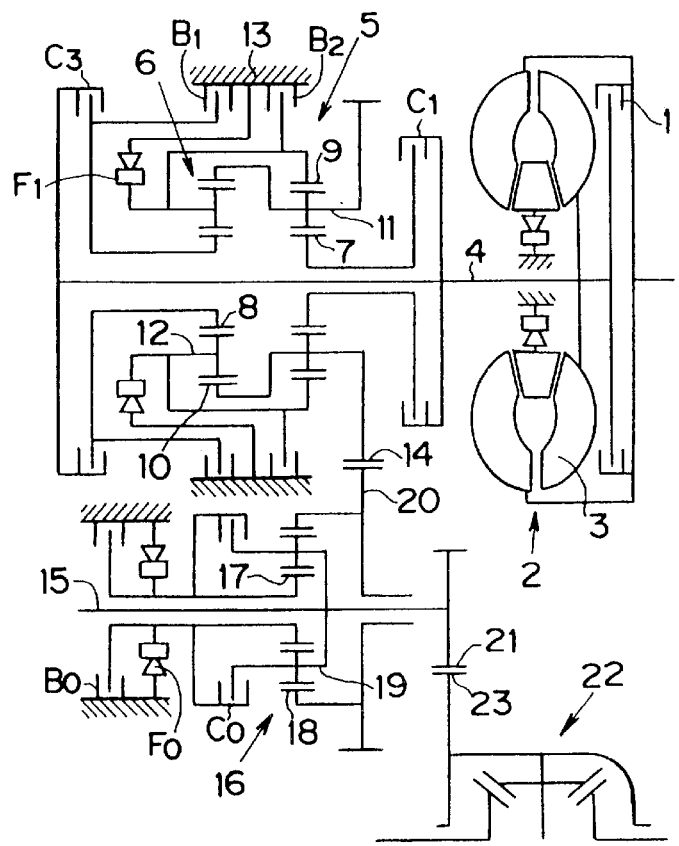
FIG. 1 is a skeleton diagram showing a first embodiment of the present invention.
Figures 5, 7:
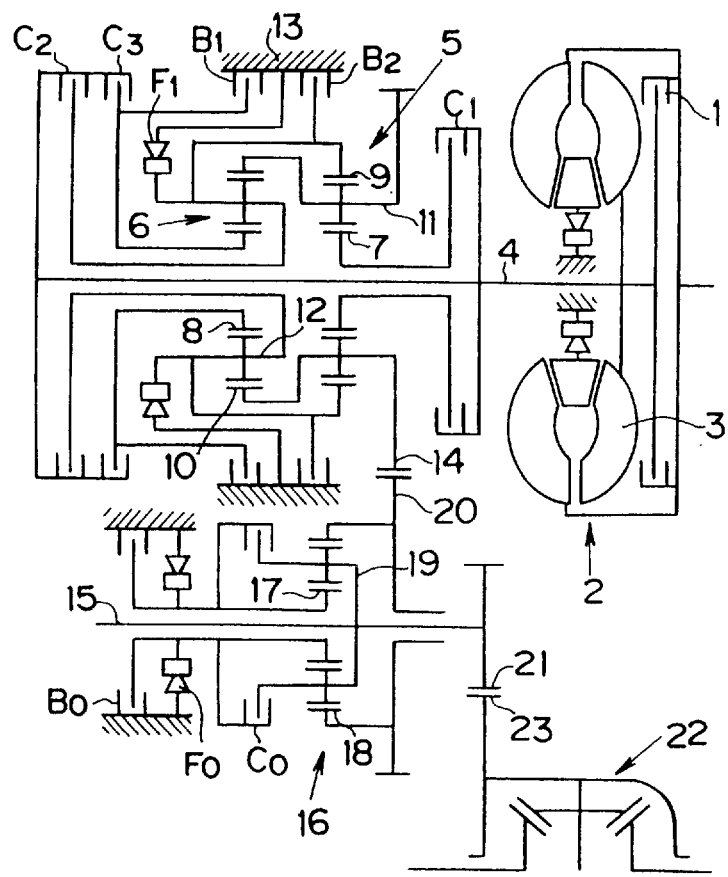
Figure 6:
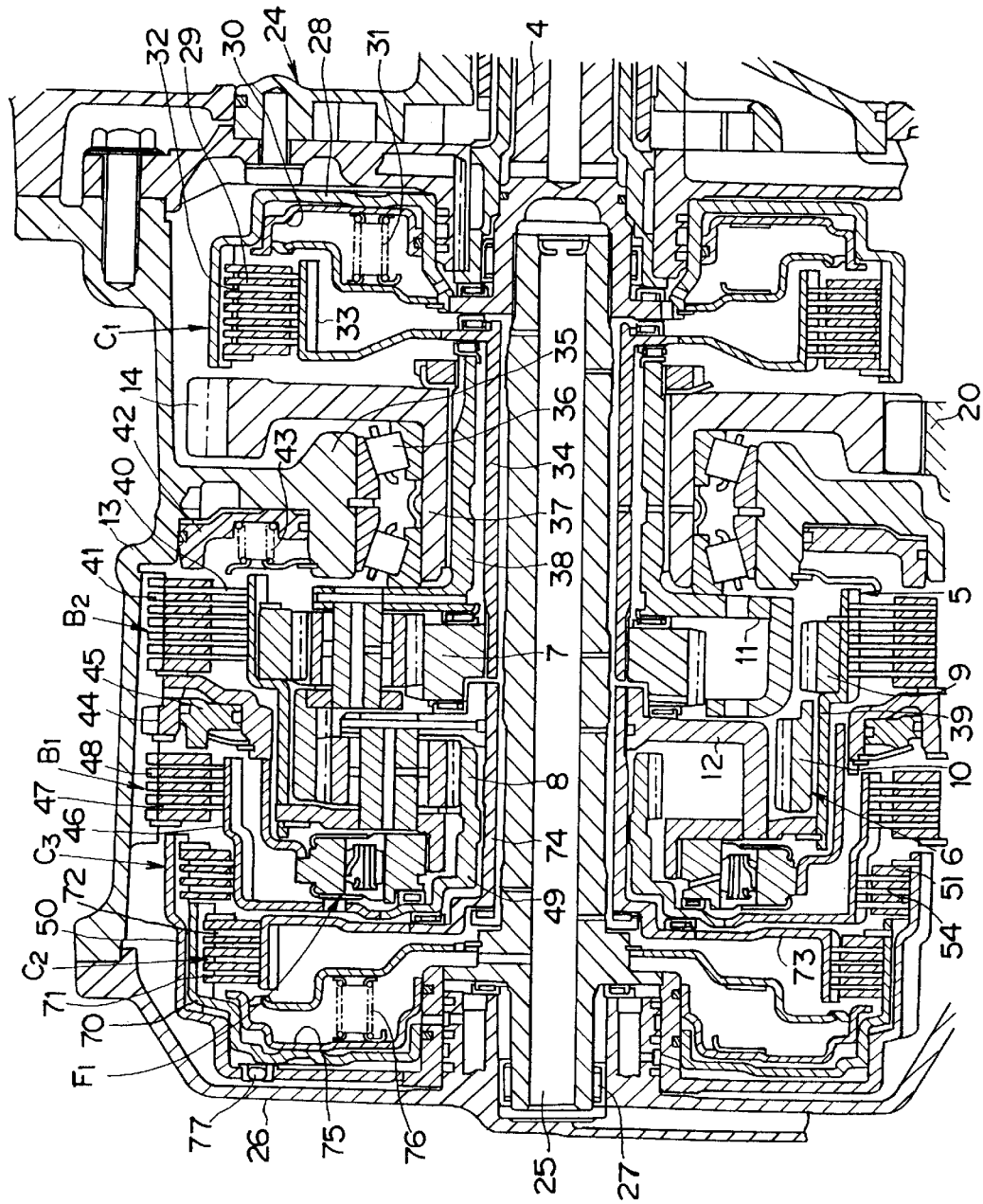

FIG. is a clutch/brake application chart of the automatic transmission shown in FIG. 1;

FIG. 5 is a skeleton diagram showing another embodiment of the present invention;

FIG. 6 is a section showing a portion of an automatic transmission embodying the construction, as shown in FIG. 5; and FIG. 7 is a clutch/brake application chart of the automatic transmission shown in FIG. 5.

DETAILED DESCRIPTION OF THE PREFERRED EMBODIMENTS

The present invention will be specifically described with reference to the accompanying drawings. First of all, here will be described the case in which the present invention is constructed into a four-speed automatic transmission, as shown in FIG. 1. To a turbine runner 3 of a torque converter 2 having a lockup clutch 1, there is connected an input shaft 4. On the same axis as that of this input shaft 4, there are arranged a first planetary gear mechanism 5 and a second planetary gear mechanism 6. These planetary gear mechanisms 5 and 6 are the single-pinion type planetary gear mechanisms which individually have three components of: sun gears 7 and 8; ring gears 9 and 10 or internal gears arranged on concentric circles of the sun gears 7 and 8; and carriers 11 and 12 holding the pinions meshing with those sun gears 7 and 8 and ring gears 9 and 10.

Of these planetary gear mechanisms 5 and 6, the carrier 11 of the first planetary gear mechanism 5, as located at the righthand side of FIG. 1, and the ring gear 10 of the second planetary gear mechanism 6 at the lefthand side are connected to rotate together with each other, and the ring gear 9 of the first planetary gear mechanism 5 and the carrier 12 of the second planetary gear mechanism 6 are connected to rotate together with each other. Thus, the carriers 11 and 12 and the ring gears 9 and 10 of those first and second planetary gear mechanisms 5 and 6 are connected, as described above, to provide the totally four rotary elements: the united carrier 11 and ring gear 10; the united carrier 12 and ring gear 9; and the two sun gears 7 and 8.

There is provided a multi-disc clutch (as will be tentatively called the "first clutch") C1 for connecting the input shaft 4 selectively to one of those rotary elements, i.e., the sun gear 7 of the first planetary gear mechanism 5. There is further provided a multi-disc clutch (as will be tentatively called the "third clutch") C3 for connecting the sun gear 8 of the second planetary gear mechanism 6 selectively to the input shaft 4.

As the brake means, there is interposed between the sun gear 8 and a casing 13 a multi-disc brake (as will be tentatively called the "first brake") B1 for braking the rotation of the sun gear 8 of the second planetary gear mechanism 6 selectively. Between the ring gear 9 of the first planetary gear mechanism 5 and the carrier 12 of the second planetary gear mechanism 6, as united to each other, and the casing 13, there is interposed a multi-disc brake (as will be tentatively called the "second brake") B2 for braking the rotation of the ring gear 9 and the carrier 12, as united. A one-way clutch F1 is further provided in parallel with that second brake B2.

A counter-drive gear 14 is attached to another rotary element, i.e., the carrier 11 of the first planetary gear mechanism 5 and the ring gear 10 of the second planetary gear mechanism 6, as united.

Here will be described the arrangements of the above-specified components. The first planetary gear mechanism 5 and the second planetary gear mechanism 6 are arranged adjacent to each other. The first clutch C1 is arranged between the first planetary gear mechanism 5 and the torque converter 2, and the counter-drive gear 14 is arranged between the first clutch C1 and the first planetary gear mechanism 5. On the other hand, the third clutch C3 is arranged at the opposite side of the first clutch C1 across the individual planetary gear mechanisms 5 and 6, and the one-way clutch F1 is arranged between the third clutch C3 and the second planetary gear mechanism 6.

In parallel with the input shaft 4, namely, in parallel with the center axis of the individual planetary gear mechanisms 5 and 6, there is arranged a counter shaft 15. On the same axis of this counter shaft 15, there is arranged a third planetary gear mechanism 16. This third planetary gear mechanism 16 is the single-pinion type planetary gear mechanism which has the three components of: a sun gear 17; a ring gear 18 or an internal gear arranged on a concentric circle of the sun gear 17; and a carrier 19 holding a pinion meshing with those sun gear 17 and ring gear 18.

Adjacent to this third planetary gear mechanism 16, there is arranged a counter-driven gear 20 which is made rotatable on the same axis as that of the counter shaft 15 and in meshing engagement with the counter-drive gear 14. Moreover, the ring gear 18 of the third planetary gear mechanism 16 is connected to rotate together with the counter-driven gear 20, and the carrier 19 is also connected to rotate together with the counter-shaft 15.

A multi-disc clutch C0 is interposed to connect the sun gear 17 and the carrier 19 of the three components of the third planetary gear mechanism 16 selectively. Between the sun gear 17 and the casing 13, there is arranged a multi-disc brake B0 for braking the rotation of the sun gear 17 selectively. Moreover, a one-way clutch F0 is arranged between the sun gear 17 and the casing 13 and in parallel with the brake B0.

To the end portion of the counter shaft 15, as located at the righthand side of FIG. 1 or at the side of the torque converter 2, there is attached an output gear 21 which is in meshing engagement with a ring gear 23 in a differential 22.

Figure 2:
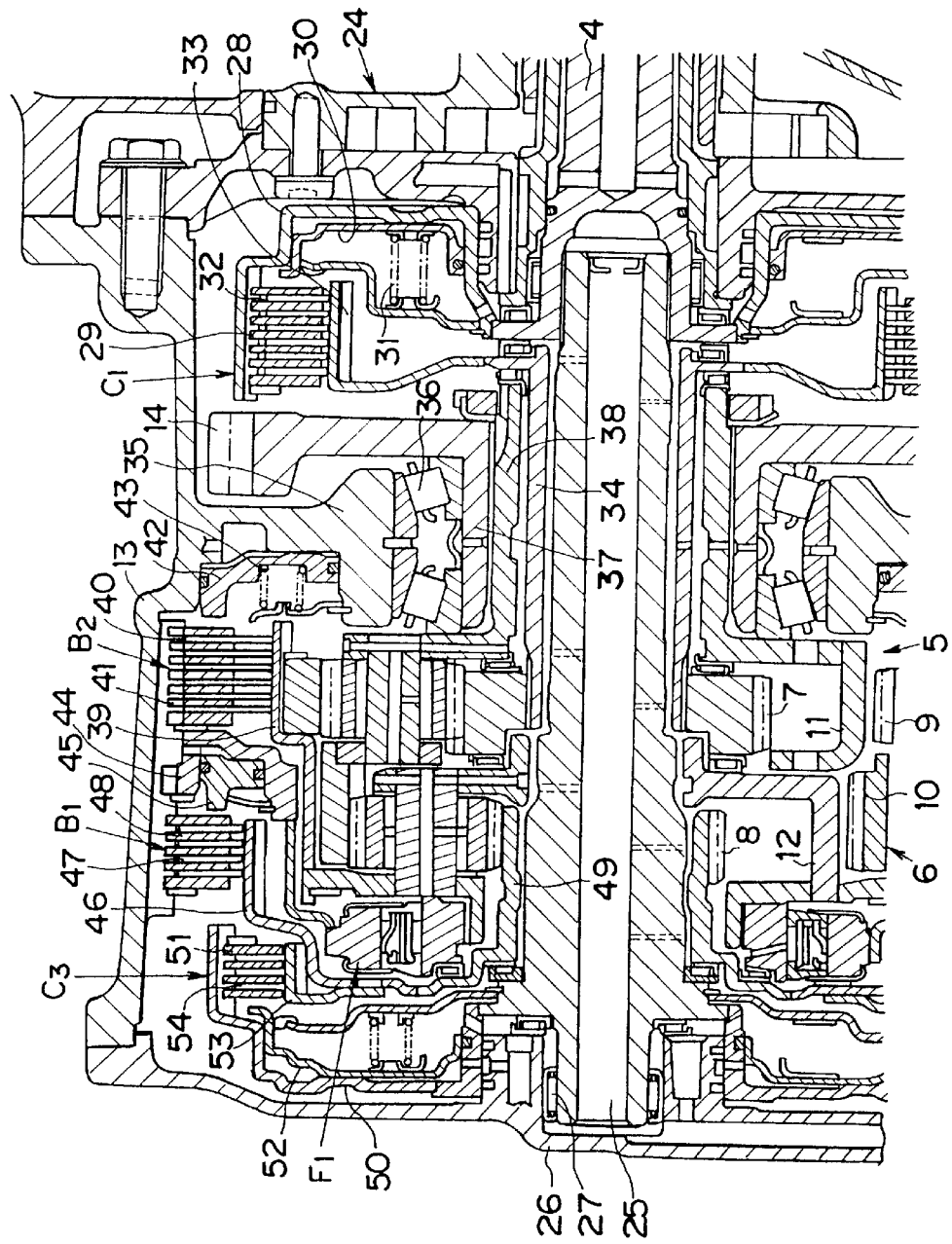
FIG. 2 is a section showing a portion of an automatic transmission embodying the construction, as shown in FIG. 1.
Figure 3:
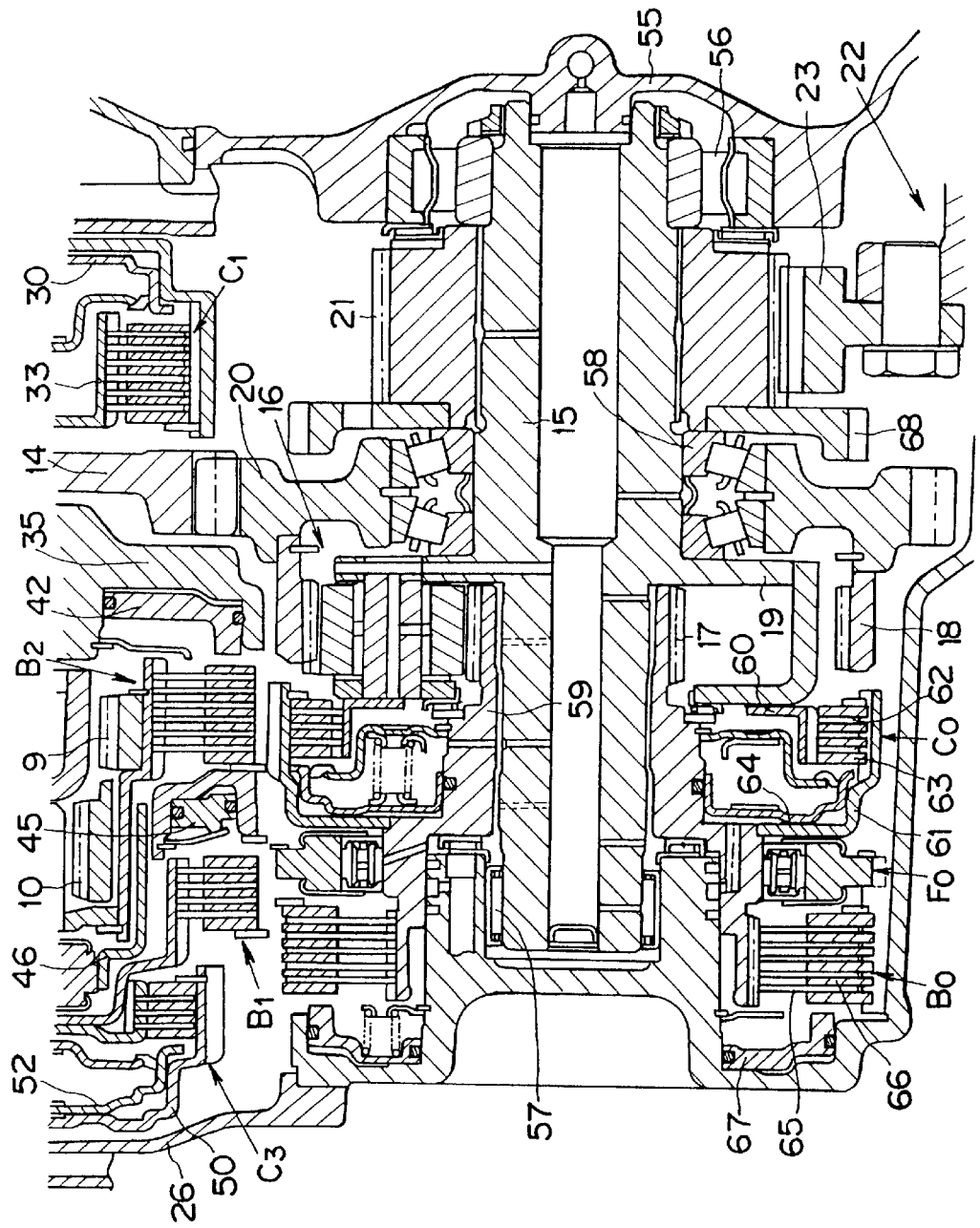
FIG. 3 is a section showing another portion of the automatic transmission shown in FIG. 2.

The automatic transmission thus far described is more specifically embodied in sections in FIGS. 2 and 3. In the opening of the casing 13 at the side of the torque converter 2, there is mounted a hydraulic pump 24, the central portion of which is axially passed through by the input shaft 4. To the leading end portion of this input shaft 4, there is so coaxially connected a second input shaft 25 as to rotate together. Specifically, one end portion of the second input shaft 25 is splined to the leading end portion of the input shaft 4, and the other end portion of the second input shaft 25 is rotatably held through a bearing 27 by an end cover 26 which is attached to the end portion of the casing 13, as located at the opposite side of the torque converter 2.

The hydraulic pump 24 has a boss portion protruded away from the torque converter 2. Around this boss portion, there is rotatably fitted a clutch drum 28 of the first clutch C1. This clutch drum 28 has a cylindrical portion at its inner circumference and is so connected at its cylindrical portion to the leading end portion of the input shaft 4 as to rotate together. The clutch drum 28 has another cylindrical portion at its outer circumference, and a plurality of clutch plates 29 are splined to the inner circumference of the cylindrical portion. The clutch drum 28 further has side wall portions connecting their inner and outer circumference cylindrical portions. A piston 30 is arranged to confront the inner faces of-the side wall portions such that it can move back and forth in the axial directions while retaining a liquid-tight state. Incidentally, reference numeral 31 appearing in FIG. 2 designates a return spring.

On the inner circumference of the clutch drum 28, there is arranged a clutch hub 33, to which are splined clutch plates 32 arranged alternately of the clutch plates 29. This clutch hub 33 is equipped integrally with a hollow stem 34 which is rotatably fitted on the second input shaft 25. The hollow stem 34 is extended to the axially intermediate portion of the second input shaft 25.

Around the hollow stem 34, there is provided an annular center support portion 35 which is protruded radially inward from the inner face of the casing 13. The counter-drive gear 14 is rotatably held by a pair of bearings 36 which are fitted on the inner circumference of the center support portion 35. Specifically, the counter-drive gear 14 is arranged between the center support portion 35 and the first clutch C1 and has an integral cylindrical stem 37 at its center portion. This cylindrical stem 37 is so fitted on the inner circumferences of the bearings 36 that the counter-drive gear 14 is rotatably held by the bearings 36. To the inner circumferential portion of the cylindrical stem 37, moreover, there is splined a carrier shaft 38 which is united with the carrier 11 of the first planetary gear mechanism 5. In other words, the carrier 11 and the counter-drive gear 14 are united through the carrier shaft 38.

The first and second planetary gear mechanisms 5 and 6 having their carriers 11 and 12 and ring gears 9 and 10 connected, as described hereinbefore, are arranged at the opposite side of the counter-drive gear 14 across the center support portion 35. This arrangement is in the order of the first planetary gear mechanism 5 and the second planetary gear mechanism 6 from the side of the center support portion 35. In the first planetary gear mechanism 5, the carrier 11 is united with the carrier shaft 38, and the sun gear 7 is splined to the hollow stem 34 which is united with the clutch hub 33. Around the first planetary gear mechanism 5, on the other hand, there is arranged a connecting drum 39 connecting the ring gear 9-and the carrier 12 of the second planetary gear mechanism 6. To the outer circumference of the connecting drum 39, there are splined a plurality of brake plates 40 constructing the second brake B2. To the inner face of the casing 13, there are splined brake plates 41 which are arranged axially alternately of the brake plates 40.

Incidentally, the hydraulic servo mechanism for applying the second brake B2 is mounted in the center support portion 35. In the side face of this center support portion 35, as located at the lefthand side of FIG. 2, there is fitted a piston 42 which is made movable back and forth in the axial direction while retaining a liquid-tight state. A return spring 43 is arranged at the front face side of the piston 42.

Around the second planetary gear mechanism 6, there is arranged a cylinder member 44 which is adjacent to the second brake B2. This cylinder member 44 is fixed on the inner face of the casing 13 so as to hold a piston 45 for applying the first brake B1. Moreover, the cylinder member 44 is recessed at its portion, as located at the lefthand side of FIG. 2, to fit the piston 45 such that the piston 45 can move back and forth in the axial directions while retaining a liquid-tight state. As the return spring for the piston 45, there is adopted a diaphragm spring.

Adjacent to the second planetary gear mechanism 6, there is arranged the one-way clutch F1. This one-way clutch F1 has a number of sprags sandwiched between its inner and outer races, of which the inner race is connected to the carrier 12 of the second planetary gear mechanism 6. On the other hand, the outer race is engaged and united in the rotational direction with a cylindrical member which is extended from the cylinder member 44 to the side portion of the second planetary gear mechanism 6. Thus, the one-way clutch F1 is applied when the carrier 12 rotates backward (i.e., in the opposite direction to that of the input shaft 4).

There is provided a brake hub 46 which is shaped to cover the outer circumferences of the one-way clutch F1 and the second planetary gear mechanism 6. This brake hub 46 constructs the first brake B1, and a plurality of brake plates 47 are splined to the outer circumference of the cylindrical portion of the brake hub 46. Moreover, brake plates 48, as arranged alternately of the brake plates 47, are splined to the inner face of the casing 13. The piston 45 confronts the brake plates 47 and the brake plates 48 in the axial direction.

The inner circumference of the brake hub 46 is extended as far as the outer circumference of the second input shaft 25 and is united with a cylindrical stem 49 which is rotatably fitted around the second input shaft 25. Moreover, the sun gear 8 of the second planetary gear mechanism 6 is formed around the end portion of the cylindrical stem 49.

Here will be described the construction of the third clutch C3. In the inner face of the end cover 26, there is formed a boss which retains the bearing 27 in its inner circumference. Around this boss, there is so fitted a clutch drum 50 that it can rotate while retaining a liquid-tight state. This clutch drum 50 is composed of: an inner cylindrical portion fitted on the boss of the end cover 26; an outer cylindrical portion, to which are splined a plurality of clutch plates 51; and a side wall portion uniting these cylindrical portions. These three components define a hollow portion, in which is so fitted a piston 52 as to move forward or rightward of FIG. 2 while keeping a liquid-tight state. Moreover, the inner cylindrical portion is connected to the second input shaft 25.

Within and concentrically of the outer cylindrical portion of the clutch drum 50, there is arranged a clutch hub 53 which is fixed on the outer face of the brake hub 46 of the first brake B1. Around the clutch hub 53, moreover, there are splined clutch plates 54 which are arranged alternately of the clutch plates 51, thus forming the third clutch C3.

The counter shaft 15 is arranged in parallel with the second input shaft 25 and has one end portion rotatably held by a torque converter housing 55 through a bearing 56 and the other end portion rotatably held by the casing 13 through a bearing 57. The counter-driven gear 20 is rotatably mounted through a bearing 58 on the axially intermediate portion of the counter shaft 15, namely, around the counter-drive gear 14.

At the lefthand side of the counter-driven gear 20, as seen from FIG. 3, there is arranged the third planetary gear mechanism 16. The carrier 1.9 of this third planetary gear mechanism 16 acts as the flange portion which is radially protruded from the counter shaft 15, and is connected to the counter shaft 15 by fitting a pinion pin in the flange portion. Moreover, the ring gear 18 of the third planetary gear mechanism 16 is connected to the counter-driven gear 20.

Around the counter shaft 15, on the other hand, there is rotatably fitted a cylindrical sun gear shaft 59 which has the sun gear 17 at its leading end portion (or at the righthand end portion, as seen from FIG. 3). To the end portion of the pinion pin, as located at the opposite side of the counter-driven gear 20, there is attached a cylindrical clutch hub 60. A clutch drum 61, as arranged around and concentrically of the clutch hub 60, is connected to and united with the sun gear shaft 59. These clutch hub 60 and clutch drum 61 construct the clutch C0 of the third planetary gear mechanism 16. Clutch plates 62 are splined to the outer circumference of the clutch hub 60, and clutch plates 63 are splined to the inner circumference of the clutch drum 61.

Moreover, the clutch drum 61 and the sun gear shaft 59 form together the cylinder portion, in which is so fitted a piston 64 as to move back and forth while keeping a liquid-tight state with respect to the clutch plates 62 and the clutch plates 63.

The outer circumference of the sun gear shaft 59, as adjacent to the portion carrying the clutch drum 61, provides the inner race of the one-way clutch F0 and has a number of sprags arrayed thereon. Around these sprags, on the other hand, there is fitted an outer race, which is splined to the inner circumference of the casing 13.

Around the lefthand end portion of the sun gear shaft 59, as seen from FIG. 3, there are splined a plurality of brake plates 65 which construct the brake B0. To the inner circumference of the casing 13, there are splined brake plates 66 which are arranged alternately of the brake plates 65. A piston 67 for applying the brake B0 is so fitted in the cylinder portion defined by the inner face of the casing 13 as to move back and forth while keeping a liquid-tight state.

To the outer circumference of the counter shaft 15, as located at the opposite side of the third planetary gear mechanism 16 across the counter-driven gear 20, there is splined the output gear 21 which is united with a parking gear 68.

The automatic transmission thus constructed is enabled to establish four forward and one reverse gear stages by applying the clutches/brakes, as tabulated in FIG. 4. In the chart of FIG. 4: symbols ○ indicate the applied state; symbols X indicate the released state; and symbols △ indicate the applied state at a shifting time. Moreover: letter P indicates a parking range; letter N indicates a neutral range; letter R indicates a reverse range; letter D indicates a drive range; numeral 2 a "2" range or an engine braking range for an upshift to the 2nd speed; and letter L indicates a low range for setting the 1st speed at which the engine braking is effective. The individual gear stages will be briefly described in the following.

The first forward speed is established by applying the first clutch C1 and accordingly the first one-way clutch F1 and by applying the brake B0 or the one-way clutch F0 on the counter shaft 15. Specifically, as the first clutch C1 is applied so that the sun gear 7 of the first planetary gear mechanism 5 rotates together with the input shaft 4, the ring gear 9 is caused to rotate backward by the load on the carrier 11, so that the one-way clutch F1 is applied. As a result, the sun gear 7 rotates together with the input shaft 4 with the ring gear 9 being stationary, so that the carrier 11 and the counter-drive gear 14 united with the former are decelerated to rotate forward while being decelerated with respect to the input shaft 4.

In the third planetary gear mechanism 16, on the other hand, the brake B0 is applied to brake the sun gear 17, but the ring gear 18 is connected to the counter-driven gear 20 so that it acts as the input element. Thus, the third planetary gear mechanism 16 is in the underdrive state. As a result, the driving force, as transmitted from the counter-drive gear 14 to the counter-driven gear 20, is decelerated by the third planetary gear mechanism 16 and is transmitted to the differential 22 through the counter shaft 15 and the output gear 21.

Thus, the 1st speed in the drive state is established by applying the one-way clutch F1. Therefore, the second brake B2, as arranged in parallel with the one-way clutch F1, is applied when the engine braking is to be effected.

The 2nd speed is established by applying the first brake B1 from the state of the 1st speed. Specifically, the sun gear 8 of the second planetary gear mechanism 6, as has been rotated backward at the 1st speed, is stopped by the first brake B1. As a result, the ring gear 9 of the first planetary gear mechanism 5 and the carrier 12 of the second planetary gear mechanism 6, as united with the former, slowly rotate forward so that the output elements, namely, the carrier 11 of the first planetary gear mechanism 5 and the ring gear 10 of the second planetary gear mechanism 6 rotate forward at a higher RPM than that at the 1st speed. Incidentally, the third planetary gear mechanism 16 is kept in the aforementioned underdrive state.

Thus, the upshift from the 1st to 2nd speeds is achieved when the one-way clutch F1 is released as the first brake B1 is applied. As a result, the speed change can be smoothly made even with a high torque fluctuation and can be controlled with ease.

The 3rd speed is established in the 2nd-speed state by releasing the first brake B1 and by applying the third clutch C3. As a result, at this 3rd speed, both the sun gears 7 and 8 of the first and second planetary gear mechanisms 5 and 6 are connected to the input shaft 4 so that the entirety of the planetary gear mechanisms 5 and 6 and the counter-drive gear 14 rotate together with the input shaft 4. In short, the first planetary gear mechanism 5 and the second planetary gear mechanism 6 take the so-called "direct-coupled state". On the other hand, the third planetary gear mechanism 16 is held in the underdrive state as in the aforementioned 1st- and 2nd-speed states.

As a result, the upshift from the 2nd to 3rd speeds is the so-called "clutch-to-clutch shift", in which the applied/released states of the first brake B1 and the third clutch C3 are switched. However, this speed changes between the 2nd and 3rd speeds will occur less frequently after the start and in the course of a cruising or a stop, and the fluctuation width of the torque between the 2nd and 3rd speeds is less than that of the torque between the 1st and 2nd speeds. Hence, the speed changes will hardly deteriorate the riding comfort for the entire vehicle even if they are effected in the clutch-to-clutch manner.

The 4th speed is established in the 3rd-speed state by releasing the brake B0 and applying the clutch C0 at the side of the third planetary gear mechanism 16. Specifically, the third planetary gear mechanism 16 is switched from the underdrive state to the direct coupled state by applying the clutch C0 to connect the carrier 19 and the sun gear 17 of the third planetary gear mechanism 16. In short, the upshift is effected by the third planetary gear mechanism 16. In this case, the underdrive state of the third planetary gear mechanism 16 is established, if in the drive state (or power ON state), by applying the one-way clutch F0 to prevent the reverse rotation of the sun gear 17. By releasing the brake B0 prior to the upshift, therefore, the one-way clutch F0 is released as the clutch C0 is applied, so that the upshift is achieved. In short, the speed change is not made by the clutch-to-clutch manner.

Since the automatic transmission is constructed to set the 4th speed as its highest gear stage, this 4th speed is set in the ordinary cruising and may be temporarily shifted down to the 3rd speed when the running vehicle speed temporarily drops or when the throttle opening increases. Thus, the speed changes between the 4th and 3rd speeds are highly frequent but employ the one-way clutch F0. As a result, the speed change can be made without any shift shock and controlled with ease.

Incidentally, the reverse stage is established by applying the three components, i.e., the third clutch C3, the second brake B2 and the brake B0 at the side of the third planetary gear mechanism 16. In the second planetary gear mechanism 6, therefore, the sun gear 8 rotates together with the input shaft 4 with the carrier 12 being held stationary, so that the ring gear 10 and the counter-drive gear 14, as united with the former, are decelerated to rotate backward with respect to the input shaft 4. Since the sun gear 17 is held by the brake B0, the third planetary gear mechanism 16 is in the underdrive state so that the drive force, as transmitted to the counter-driven gear 20, is further decelerated and outputted from the output gear 21 to the differential 22.

Thus, in the automatic transmission, the speed changes between the lowest stage or 1st speed and the next higher stage or 2nd speed and between the highest stage or 4th speed and the next lower state or 3rd speed are executed by applying the one-way clutches F1 and F0. As a result, the speed change between the 1st and 2nd speeds, as might otherwise have high torque fluctuation, can be smoothly and easily executed, and the speed change between the 3rd and 4th speeds, as will frequently occur, can be facilitated. Moreover, since the individual one-way clutches F1 and F0 are arranged to hold such rotary members (e.g., the carrier 12 of the second planetary gear mechanism 6 and the sun gear 17 of the third planetary gear mechanism 16) as will not rotate backward in the drive state, no brake means need not be interposed between those one-way clutches F1 and F0 and the casing 13. This makes it unnecessary to provide any multi-disc type frictional engagement unit in which the one-way clutches F1 and F0 are arranged in series, so that the automatic transmission thus constructed can shorten the axial length. This is partly because the friction plates of the multi-disc type frictional engagement unit have to be arrayed in the axial direction and partly because the hydraulic servo mechanism has to be arrayed in the axial direction with respect to the friction plates.

The automatic transmission thus constructed can be modified into a five-speed automatic transmission by making small improvements, as embodied in FIG. 5. At the opposite side of the second planetary gear mechanism 6 across the third clutch C3, as shown in FIG. 5, there is arranged a multi-disc type clutch (as will be tentatively called the "second clutch") C2, as located adjacent to the third clutch C3. The second clutch C2 is constructed to connect the carrier 12 of the second planetary gear mechanism 6 and the input shaft 4 selectively. Incidentally, the remaining construction of FIG. 5 is similar to that shown in FIG. 1, and its description will be omitted by designating the common members by the same reference numerals as those of FIG. 4.

A more specified embodiment of FIG. 5 is shown in FIG. 6. The construction, as shown in. FIG. 6, is an improvement over the construction, as shown in FIGS. 2 and 3, such that the second input shaft 25 is slightly reduced in the radial direction and is elongated. Moreover, the end cover 26 is made a bit deeper than that of the embodiment shown in FIG. 2 as to have a larger content volume.

The clutch drum 50 of the third clutch C3, as rotatably fitted in the boss of the end cover 26, is given a larger diameter than that of the embodiment of FIG. 2, and the brake hub 46 of the first brake B1 is given an accordingly enlarged diameter. Moreover, the clutch plates 54 of the third clutch C3 is directly splined around the radially enlarged brake hub 46. In other words, the clutch hub 53 of the third clutch C3, as shown in FIG. 2, is eliminated.

In the radially enlarged clutch drum 50, there is fitted a piston 70 which can move back and forth in the axial directions while keeping a liquid-tight state. This piston 70 has an outer cylindrical portion confronting the clutch plates 54 in the axial direction and the clutch plates 51 of the third clutch C3 so that the outer cylindrical portion pushes the clutch plates 54 and the clutch plates 51 at its leading end to apply the third clutch C3.

To the inner circumference of the outer cylindrical portion of the piston 70, on the other hand, there are splined a plurality of clutch plates 71 which construct the second clutch C2. In other words, the piston 70 also acts the clutch drum of the second clutch C2. Clutch plates 72, as arranged alternately of the clutch plates 71, are splined around a clutch hub 73 which is arranged concentrically of the outer cylindrical portion. This clutch hub 73 is connected to the carrier 12 of the second planetary gear mechanism 6. Specifically, a hollow shaft or carrier shaft 74 is rotatably arranged in the inner circumference of the sun gear shaft 49, and the clutch hub 73 is connected and united with the end portion of the carrier shaft 74, as located at the lefthand side of FIG. 6.

The piston 70 further acts as the cylinder member of the hydraulic servo mechanism for the second clutch C2. In this piston 70, there is so arranged a piston 75 confronting the clutch plates 71 and the clutch plates 72 of the second clutch C2 at its leading end as can move back and forth in the axial directions while keeping a liquid-tight state.

Incidentally, reference numeral 76 appearing in FIG. 6 designates a return spring, and numeral 77 designates a check ball valve. The remaining construction is similar to that shown in FIGS. 2 and 3, and its description will be omitted by designating the common members of FIG. 6 by the same reference numerals as those of FIGS. 2 and 3.

The automatic transmission, as shown in FIGS. 5 and 6, can establish five forward gear stages, and its application chart for the frictional engagement unit is tabulated in FIG. 7. The individual gear stages will be briefly described in the following. The reverse stage and the 1st and 2nd speeds are established as in the foregoing four-speed automatic transmission shown in FIGS. 1 to 3.

The 3rd speed, at which the first planetary gear mechanism 5 and the second planetary gear mechanism 6 are brought into the so-called "direct coupled state", is established by applying the first and second clutches C1 and C2 and the brake B0 or the one-way clutch F0 at the side of the third planetary gear mechanism 16. In short, the second clutch C2 is applied in place of the aforementioned third clutch C3. This application is done to improve the transmission efficiency of the torque by coupling the two elements or the sun gear 7 and the ring gear 9 of the first planetary gear mechanism 5 directly to the input shaft 4. In this case, the third clutch C3 may also be applied.

The 4th speed is the gear stage that cannot be set before the second clutch C2 is provided. For this gear stage, the second clutch C2 and the first brake B1 are applied to bring the first planetary gear mechanism 5 and the second planetary gear mechanism 6 into the overdrive state, and the brake B0 or the one-way clutch F0 is applied to bring the third planetary gear mechanism 16 into the underdrive state. Specifically, in the second planetary gear mechanism 6, with the sun gear 8 being braked by the first brake B1, the carrier 12 is connected to the input shaft 4 so,that the ring gear 10 and the counter-drive gear 14, as connected to the former, are accelerated to rotate forward with respect to the input shaft 4. Thus, the drive force, as transmitted from the counter-drive gear 14 to the counter-driven gear 20, is decelerated by the third planetary gear mechanism 16 and is outputted from the output gear 21 to the differential 22.

The 5th speed is established by applying the clutch C0 of the third planetary gear mechanism 16 in the aforementioned 4th speed to shift up the third planetary gear mechanism 16 to the direct coupled state. As a result, the drive force, as transmitted through the counter-drive gear 14 and the counter-driven gear 20, is outputted, as it is not decelerated, from the output gear 21 to the differential 22.

As a result, even if the five-speed automatic transmission is constructed by adding the second clutch C2, both the shift of high torque fluctuation between the 1st speed and the 2nd speed and the highly frequent shift between the 4th speed and the 5th speed are established by applying the one-way clutches F1 and F0 so that the smooth shifts of little shock can be easily executed as in the foregoing four-speed automatic transmission. In the construction shown in FIGS. 5 and 6, too, the frictional engagement unit of multi-disc structure need not be arranged in series with the one-way clutches F1 and F0 although the second clutch C2 is added, so that the automatic transmission can be axially shortened.

According to the constructions thus far described, moreover, the automatic transmission can be easily interchanged between that capable of setting the four forward stages and that capable of setting the five forward stages merely be adding or omitting the second clutch C2 and by changing the associated parts slightly. Thus, the change in the number of gear stages to be set can be made more easily than the prior art in which the automatic transmission is changed into one having a different gear stage number by adding or eliminating the planetary gear mechanism.

Here will be summarized the advantages to be attained by the present invention. According to the present invention, the automatic transmission is enabled to establish the four speeds at its forward stages by arranged the two sets of planetary gear mechanisms on the common axis and by arranged another set of planetary gear mechanism in parallel with the two series planetary gear mechanisms. In addition, the automatic transmission can be axially shortened to improve the mountability.

Moreover, the four-speed automatic transmission and the five-speed automatic transmission can be interchanged by adding or eliminating only one clutch means. This allows the parts to be shared between the automatic transmissions of different types.

In the automatic transmission of the present invention, still moreover, the shift between the lowest gear stage and the next higher gear stage is executed by applying the one-way clutch so that the shift, which might otherwise have serious torque fluctuation, can be effected smoothly and easily.

In addition, in the automatic transmission of the present invention, the two components of the two sets of planetary gear mechanisms, as arranged on the common axis, can be simply connected, and the planetary gear mechanisms themselves can be arranged adjacent to each other. Thus, it is possible to provide an automatic transmission which is compact in its entirety.

What is claimed is:

1. An automatic transmission which has: first and second planetary gear mechanisms arrayed on a common axis and each including three components of a sun gear, a ring gear and a carrier such that any two of the components of said first planetary gear mechanism are connected one-by-one to any two of three components of said second planetary gear mechanism to construct four rotary elements; and a third planetary gear mechanism arranged on an axis parallel to the common axis of said first and second planetary gear mechanisms and including three components of a sun gear, a ring gear and a carrier such that first ones of said four rotary elements and any of the three components of said third planetary gear mechanism are connected to transmit power, comprising:

an input member for inputting drive power;

first clutch means for connecting the second one of said four rotary elements and said input member selectively;

second clutch means for connecting said input member and the third element of said four rotary elements selectively;

an output member connected to a component other than such one of the three components of said third planetary gear mechanism that is connected to said first rotary elements;

a one-way clutch arranged between any of the three components of said third planetary gear mechanism and a stationary member and adapted to be switched to an applied state when said third planetary gear mechanism is to be switched between a high-speed drive state, at which said output member rotates at a high speed, and a low-speed drive state at which the same rotates at a low speed;

another one-way clutch arranged between said second planetary gear mechanism and said second clutch means and having an inner race connected to the carrier of said second planetary gear mechanism;

first brake means arranged around said second planetary gear mechanism for braking the sun gear of said second planetary gear mechanism selectively; and a cylinder member having a piston for applying said first brake means and connected to the outer race of said another one-way clutch, wherein said first planetary gear mechanism, said second planetary gear mechanism, said first clutch means and said second clutch means are arrayed on the common axis in the order of said first clutch means, said first planetary gear mechanism, said second planetary gear mechanism and said second clutch means.

2. An automatic transmission according to claim 1, further comprising second brake means arranged in parallel with said another one-way clutch for braking the ring gear of said first planetary gear mechanism and the carrier of said second planetary gear mechanism selectively.

3. An automatic transmission which has: first and second planetary gear mechanisms arrayed on a common axis and each including three components of a sun gear, a ring gear and a carrier such that any two of the components of said first planetary gear mechanism are connected one-by-one to any two of the components of said second planetary gear mechanism to construct four rotary elements; and a third planetary gear mechanism arranged on an axis parallel to the common axis of said first and second planetary gear mechanisms and including three components of a sun gear, a ring gear and a carrier such that first ones of said four rotary elements and any of the three components of said third planetary gear mechanism are connected to transmit a power, comprising:

an input member for inputting drive power;

first clutch means for connecting the second one of said four rotary elements and said input member selectively;

second clutch means for connecting said input member and the third element of said four rotary elements selectively;

an output member connected to a component other than such one of the three components of said third planetary gear mechanism as is connected to said first rotary elements;

a one-way clutch arranged between any of the three components of said third planetary gear mechanism and a stationary member and adapted to be switched to an applied state when said third planetary gear mechanism is to be switched between a high-speed drive state, at which said output member rotates at a high speed, and a low-speed drive state at which the same rotates at a low speed; and third clutch means for connecting said input member and the fourth ones of said four rotary elements selectively;

wherein said first planetary gear mechanism, said second planetary gear mechanism and said first to third clutch means are arrayed on the common axis in the order of said first clutch means, said first planetary gear mechanism, said second planetary gear mechanism, said second clutch means and said third clutch means;

wherein said second clutch means includes a clutch drum having an inner circumference to which are splined a plurality of friction plates, and wherein said third clutch means includes: another clutch drum so arranged within said clutch drum as to move back and forth in the axial directions toward said friction plates thereby to apply said second clutch means selectively; and another friction plate splined to the inner circumference of said another clutch drum.

4. An automatic transmission which has: first and second planetary gear mechanisms arrayed on a common axis and each including three components of a sun gear, a ring gear and a carrier such that any two of the components of said first planetary gear mechanism are connected one-by-one to any two of the components of said second planetary gear mechanism to construct four rotary elements; and a third planetary gear mechanism arranged on an axis parallel to the common axis of said first and second planetary gear mechanisms and including three components of a sun gear, a ring gear and a carrier such that first ones of said four rotary elements and any of the three components of said third planetary gear mechanism are connected to transmit a power, comprising:

an input member for inputting drive power;

first clutch means for connecting the second one of said four rotary elements and said input member selectively;

second clutch means for connecting said input member and the third element of said four rotary elements selectively;

an output member connected to a component other than such one of the three components of said third planetary gear mechanism as is connected to said first rotary elements;

a one-way clutch arranged between any of the three components of said third planetary gear mechanism and a stationary member and adapted to be switched to an applied state when said third planetary gear mechanism is to be switched between a high-speed drive state, at which said output member rotates at a high speed, and a low-speed drive state at which the same rotates at a low speed;

third clutch means for connecting said input member and the fourth ones of said four rotary elements selectively;

another one-way clutch arranged between said second planetary gear mechanism and said second clutch means and having an inner race connected to the carrier of said second planetary gear mechanism;

first brake means arranged around said second planetary gear mechanism for braking the sun gear of said second planetary gear mechanism selectively; and a cylinder member having a piston for applying said first brake means and connected to the outer race of said another one-way clutch;

wherein said first planetary gear mechanism, said second planetary gear mechanism and said first to third clutch means are arranged on the common axis in the order of said first clutch means, said first planetary gear mechanism, said second planetary gear mechanism, said second clutch means and said third clutch means.

5. An automatic transmission according to claim 4, further comprising second brake means arranged in parallel with said another one-way clutch for braking the ring gear of said first planetary gear mechanism and the carrier of said second planetary gear mechanism selectively.

6. An automatic transmission which has: a first planetary gear mechanism including a sun gear, a ring gear and a carrier; a second planetary gear mechanism arrayed on a common axis and including a sun gear, a ring gear integrally connected with the carrier of the first planetary gear mechanism and a carrier integrally connected with the ring gear of the first planetary gear mechanism; and a third planetary gear mechanism arranged on an axis parallel to the common axis of said first and second planetary gear mechanisms slip control wherein a pilot pressure for controlling said lock-up clutch is controlled during deceleration of the vehicle such that an actual slip amount of said lock-up clutch coincides with a predetermined target value, said apparatus comprising:

an input member for inputting drive torque;

first clutch means for connecting the sun gear of the first planetary gear mechanism and the input member selectively;

second clutch means for connecting the input member and the sun gear of the second planetary gear mechanism selectively;

an output member connected to the carrier of the third planetary gear mechanism;

a first one-way clutch arranged between any of the carrier of the second planetary gear mechanism and the ring gear of the first planetary gear mechanism and a stationary member, first brake means arranged around said second planetary gear mechanism for braking the sun gear of said second planetary gear mechanism selectively;

second brake means arranged between either of the ring gear of the first planetary gear mechanism and the carrier of the second planetary gear mechanism and the stationary member for braking the ring gear and carrier selectively;

a second one-way clutch arranged between the sun gear of the third planetary gear mechanism and the stationary member and adapted to be switched to an applied state when said third planetary gear mechanism is to be switched between a high-speed drive state, at which said output member rotates at a high speed, and a low-speed drive state at which the same rotates at a low speed;

a third clutch means for connecting the sun gear and the carrier of the third planetary gear mechanism selectively;

a third brake means for braking the sun gear of the third planetary gear mechanism selectively;

a cylinder member having a piston for applying said first brake means and connected to the outer race of said another one-way clutch, wherein said first planetary gear mechanism, said second planetary gear mechanism, said first clutch means and said second clutch means are arrayed on the common axis in the order of said first clutch means, said first planetary gear mechanism, said second planetary gear mechanism and said second clutch means.

7. An automatic transmission according to claim 6, wherein said first clutch means and said second clutch means are arrayed at the two sides across said first planetary gear mechanism and said second planetary gear mechanism and on the same axis as that of said first and second planetary gear mechanisms.

8. An automatic transmission according to claim 6, wherein said first planetary gear mechanism, said second planetary gear mechanism, said first clutch means and said second clutch means are arrayed on the common axis in the order of said first clutch means, said first planetary gear mechanism, said second planetary gear mechanism and said second clutch means.

9. An automatic transmission according to claim 8, further comprising:

a drive gear united with said first rotary elements and arranged between said first clutch means and said first planetary gear mechanism; and a driven gear meshing with said drive gear and united with any of the three components of said third planetary gear mechanism.

10. An automatic transmission according to claim 6, further comprising a fourth clutch means for connecting the input member and the carrier of the second planetary gear mechanism selectively.

11. An automatic transmission according to claim 9, wherein said first clutch means and said second clutch means are arrayed at the two sides across said first planetary gear mechanism and said second planetary gear mechanism and on the same axis as that of said first and second planetary gear mechanisms.

12. An automatic transmission according to claim 9, wherein said first planetary gear mechanism, said second planetary gear mechanism, said first clutch means and said second clutch means are arrayed on the common axis in the order of said first clutch means, said first planetary gear mechanism, said second planetary gear mechanism and said second clutch means.

13. An automatic transmission according to claim 12, further comprising:

a drive gear united with said first rotary elements and arranged between said first clutch means and said first planetary gear mechanism; and a driven gear meshing with said drive gear and united with any of the three components of said third planetary gear mechanism.

* * * * *

UNITED STATES PATENT AND TRADEMARK OFFICE
CERTIFICATE OF CORRECTION

PATENT NO. : 5,769,749
DATED : June 23, 1998
INVENTOR(S) : Makoto FUNAHASHI et al.

It is certified that error appears in the above-identified patent and that said Letters Patent is hereby corrected as shown below:

On the Title page, Item [75], the second Inventor's name is incorrect. It should be:

--Hiroshi Itoh;--

UNITED STATES PATENT AND TRADEMARK OFFICE
CERTIFICATE OF CORRECTION

PATENT NO. : 5,769,749
DATED : June 23, 1998
INVENTOR(S) : MAKOTO FUNAHASHI ET AL It is certified that error appears in the above-identified patent and that said Letters Patent is hereby corrected as shown below:

IN THE CLAIMS

Claim 6, lines 9-13 (lines 45-49 of column 15), delete "slip control wherein a pilot pressure for controlling said lock-up clutch is controlled during deceleration of the vehicle such that an actual slip amount of said lock-up clutch coincides with a predetermined target value, said apparatus"; instead, please insert --and including a sun gear, a ring gear connected with the carrier of the first planetary gear mechanism so as to transmit drive torque and a carrier,--.

Signed and Sealed this

Sixteenth Day of March, 1999

Attest:

Q. TODD DICKINSON

Attesting Officer

Acting Commissioner of Patents and Trademarks